United States Patent

Shiao

Patent Number: 5,464,473
Date of Patent: Nov. 7, 1995

[54] BACKFILL FOR ENGINEERED BARRIER

[75] Inventor: Shin J. Shiao, Hsinchu, Taiwan

[73] Assignee: Chao Ming Tsai, Taiwan

[21] Appl. No.: 66,436

[22] Filed: May 25, 1993

[51] Int. Cl.⁶ ............................................. C04B 33/00
[52] U.S. Cl. .................. 106/811; 106/812; 106/DIG. 4; 588/16; 588/17; 976/DIG. 389; 405/128
[58] Field of Search ............... 405/128; 106/DIG. 4, 106/812, 811; 588/16, 17; 976/DIG. 389

[56] References Cited

U.S. PATENT DOCUMENTS

| | | | |
|---|---|---|---|
| 4,234,469 | 11/1980 | Conner | 210/751 |
| 4,321,158 | 3/1982 | Beall et al. | 252/628 |
| 4,615,643 | 10/1986 | Gouvenot | 405/128 |
| 4,781,860 | 11/1988 | Doan | 252/628 |
| 4,790,688 | 12/1988 | Castor | 405/128 |
| 4,983,075 | 1/1991 | Delmas et al. | 405/267 |
| 5,098,612 | 3/1992 | Rowsell | 252/628 |
| 5,114,275 | 5/1992 | West et al. | 405/128 |
| 5,288,177 | 2/1994 | Montgomery et al. | 405/204 |

*Primary Examiner*—Ngoclan Mai
*Attorney, Agent, or Firm*—Michael D. Bednarek; Marks & Murase

[57] ABSTRACT

A backfill for an engineered barrier used to contain radioactive waste has a predetermined amount of clayic material and a predetermined amount of a reinforcement material with hydrophobic surface characteristics. The reinforcement material may include hydrophobic compounds selected from group consisting of organic polymers or inorganic materials on which a layer of hydrophobic compounds is formed. The hydrophobic reinforcement material results in the backfill maintaining a very low water permeability while providing high mechanical strength and other properties suitable for use in a repository of radioactive waste.

9 Claims, No Drawings

BACKFILL FOR ENGINEERED BARRIER

BACKGROUND OF THE INVENTION

1. Field of the Invention

The present invention relates generally to a material to be used as a barrier for containing radioactive wastes. In particular, the present invention concerns an improved backfill for an engineered barrier used in land disposal of radioactive wastes.

2. Description of Prior Art

The radioactive waste of nuclear power stations and other nuclear industry is potentially very harmful to mankind. The goal of a radioactive waste containment system is to contain and isolate the waste from the accessible environment for a long enough period of time to let the radioactive elements decay to a safe state (e.g., 1,000 years). The current trend of policies aimed at radioactive waste disposal favors geological disposal in landfills. For the purpose of absolute safety in the final disposal, the concept of a multi-barrier system for radioactive wastes has been established.

Backfill plays an important role in multi-barrier systems for the shallow land disposal of low-level radioactive wastes and for deep disposal of high-level radioactive wastes. Basically, the purposes of backfill are twofold: (1) to assist or enhance the ability of the waste containment system to isolate radioactive wastes; and (2) to function independently as a barrier to radionuclide migration should failure of the waste containment system occur.

It is envisioned that a backfill can fulfill the first purpose by controlling groundwater ingress and modifying the near-field groundwater chemistry to reduce the likelihood of waste container corrosion. The backfill can fulfill the second purpose (i.e., acting as an independent barrier to radionuclide migration) by possessing high radionuclide "sorptive" properties, by reducing near field groundwater flow rates to mitigate radionuclide transport away from the repository, and by controlling groundwater pH and Eh to keep multivalent radionuclides in their most favorable valence state for sorption.

In order to accomplish the functions outlined above, the backfill must possess appropriate properties. It is these properties that are the focus of the present invention. At the present time, there is no clearly accepted design basis for backfill. In fact, the role of the backfill component in the repository system, and moreover its effect on system performance, is not yet very well established.

It should be pointed out that the desired properties of backfill are often interdependent. For example, the reduction of groundwater flow to the waste package and the reduction of radionuclide transport are both dependent upon the permeability of the backfill.

In light of the multiple demands placed upon backfill, a blend of two or more materials are usually required to create an effective barrier, each material performing a particular function such as water flow control, near field chemistry control, mechanical strength, or radionuclide sorption control. With respect to these functions, the water flow control (water permeability) and mechanical strength are considered the most important.

In order to create a backfill barrier with low water permeability, high swelling pressure, and plasticity, researchers have looked to the expandable clays, such as the smectites. Because of their low permeability and their ability to seal fissures, smectites are perhaps the most crucial elements in current backfill designs. In addition, the use of clays in backfill provides an additional benefit because their relatively high ion-exchange capacities aid in radionuclide sorption and retardation. Clays also provide a mineral that is very important in minimizing container corrosion, and enables the multivalent actinides and technetium to be maintained in their reduced, most sorbable form.

The use of quartz sand as a major component in backfill is also known in the art (e.g., in the Swedish KBS program). While the Swedes have deemed that highly compacted bentonite clay is an adequate backfill for use in the disposal of spent reactor fuel rods, the thermal output of HLW poses a special problem. As a result, a modified backfill composed of from 80–90% quartz with the balance bentonite, has been proposed in order for the backfill to possess sufficient thermal conductivity. As a secondary benefit, the use of quartz adds to the mechanical strength of the fill. However, while the lower percentage of clay in the clay/sand mixture still lends an adequate degree of plasticity to the backfill, the overall sorptive capacity of the backfill is significantly diminished.

Bentonite/sand mixtures are recognized to be the most promising backfill material. In general, bentonite has low water permeability due to its high swelling pressure. It also has a high cation exchange capacity. On the other hand, sand has high heat conductivity, high dynamic strength, and is relatively inexpensive. A need exists for backfill materials possessing the characteristics of both bentonite and sand.

The biggest disadvantage associated with a mixture of bentonite and sand is the increased permeability in comparison with pure bentonite. For example, an experimental test shows that pure bentonite has a water permeability of $2 \times 10^{-11}$ cm/sec, while a mixture of 20 wt % of bentonite and 80 wt % sand has a permeability of $9 \times 10^{-8}$ cm/sec. The latter is about 5000 times greater than the former. That means the rate of the transferring of nuclides from the disposal site system through the bentonite/sand backfill would be 5000 times higher than the rate through a pure bentonite backfill. Thus, the increased effective radioactive exposure to the public in a bentonite/sand backfill limits the value of such system.

At the present time, pure bentonite clay is the most preferred backfill material and is commonly used in repository sites all over the world. Other conceptual designs include high performance concrete walls and filling materials with low permeability. While these designs may eventually evolve into effective components of advanced artificial barriers for radioactive wastes, their feasibility at the present time is limited.

Therefore, a need exists for a low-cost backfill for use in land disposal of radioactive wastes that has all of the advantages of both clay and sand, without the inherent disadvantage of increased water permeability normally associated with such mixtures.

SUMMARY OF THE INVENTION

It is an object of the present invention to provide an improved backfill for an engineered barrier in a containment system for radioactive waste.

It is a further object of the present invention to provide a backfill having a low water permeability for use in an engineered barrier.

It is a further object of the invention to provide a method for the use of low water permeability material as a backfill in an engineered barrier.

It is a further object of the invention to provide an improvement of the characteristic properties of sand used in the backfill of an engineered barrier.

It is a further object of the invention to provide a low cost backfill material including a hydrophobic medium made from organic materials.

It is a further object of the invention to improve the mechanical strength, heat conduction, ability to capture radioactive ions, and water impermeability properties of a backfill material used in an engineered barrier.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, and in accordance with the purpose of the present invention, as embodied and broadly described herein, the improved backfill of this invention may comprise a predetermined percentage of clayic material, such as bentonite, and a predetermined percentage of at least one hydrophobic material. The hydrophobic material may include organic compounds, such as polymers, or may include inorganic substrates having surfaces pretreated with hydrophobic compounds.

DETAILED DESCRIPTION OF THE INVENTION

The present invention provides an improved backfill for use in radioactive waste containment systems having engineered barriers. The backfill used in the present invention is a composition of materials including a clayic material and a hydrophobic material.

The hydrophobic material is preferably selected from a group of compounds which have hydrophobic surface characteristics. These compounds may include organic compounds selected from the group of polymers, or inorganic substrates having surfaces pretreated with organic compounds.

Hydrophobic materials that can be used for the surface treatment of inorganic substrates are selected from the group consisting of high melting point organic compounds, such as resins, heavy oils, pitch, and asphalt. Hydrophobic components such as organic titanate, organic silicone, alcohol and esters may also be used.

The clayic backfill materials that can be used include clay minerals, such as bentonite, montmorillonite, illite, laterite, kaolinite, ectorite and attapulgite.

Other materials that may be present in the backfill and can be used as the substrates of hydrophobic coating substances, include inorganic rock materials, such as salt, basalt, tuff and granite; zeolites, such as mordennite, clinoptiloite, chabasite, phillipsite and synthetics; ferrous iron minerals, such as bornite, pyrite, biotite, olivine, chalcopyrite, chlorite, garnet, magnetite and siderite; chemisorbing minerals, such as apatite, monazite, vivianite, calcite, dolomite, barite, gypsum, cinnabar, chalcocite and galena; and other materials, such as quartz, activated charcoal, synthetic titanate, powdered metals, graphite and magnesium oxide sand, clay, fly ash, oil sand, and particles crushed from stones. The substrate materials generally have hydrophilic surface characteristics until the hydrophobic surface coating is applied.

A primary characteristic of the present invention is that the traditional problems associated with mixtures of backfill (i.e., increased water permeability) are eliminated. The present invention includes the pretreatment of all reinforcement materials (e.g., sand) of backfill mixtures with hydrophobic material (i.e., the reinforcement material provides the substrate for the hydrophobic coating material). The hydrophobic coating material makes the surface of the reinforcement material not have the property of water affinity and causes the total water permeability of the backfill material to remain very low. The invention will be understood more readily with reference to the following examples:

PERMEABILITY TEST PROCEDURES

Tests of permeability were made of various samples according to ASTM D698 by The Harvard Miniature Compaction Apparatus. This test includes compacting 3 layers in a 33.3 mm i.d.×71.5 mm height diameter mold with 25 blows of a 20 lb rammer, and then testing the permeability of the compacted sample with a miniature Permeameter set of the Sioltest model K-670 Permeameter. The permeameter heads and tube are made so that high pressure permeability studies may be performed as well as standard low pressure permeability studies. The volume of permeated water in a given time interval for each of the samples in Examples 1 through 7, as described below, was measured at a constant pressure of 60 psi and a temperature of 25 ° C.

Basic Materials Used:
1) Clayic Material
   Bentonite (a Wyoming product) with a water content of 10%.
2) Substrate Material
   Sand (0.1 to 2.0 mm, D5=0.84) (Mikawa Keiseki Co., Ltd.).

Example 1 (Prior Art)

Backfill formed of 100% bentonite.

Example 2 (Prior Art)

Backfill formed of a mixture of bentonite and sand in a ratio of 2:8 by weight percent.

Example 3 (Prior Art)

Backfill formed of a mixture of bentonite and sand in a ratio of 1:9 by weight percent.

Example 4

The same as Example 2 except the sand was pretreated with Tetraisopropyl Titante (Du Pont TYZOR TPT) 2 weight percent of sand, using the method of conventional vapor-phase treatment.

Example 5

The same as Example 3 except the sand was pretreated with Tetraisopropyl Titante (Du Pont TYZOR TPT) 2 weight percent of sand, using the method of conventional vapor-phase treatment.

Example 6

The same as Example 2 except the sand was coated with polyethylene by a film of about 0.1 mm on the surface of sand.

Example 7

The same as Example 2 except the sand was coated with asphalt by a film of about 0.2 mm on the surface of sand.

The results of the permeability tests for each of the above Examples 1 through 7 are summarized in Tables 1 and 2.

TABLE 1

CONVENTIONAL BACKFILL COMPOSITIONS

| Example Number | Bentonite wt. % | Sand wt. % | Permeability k = cm/sec |
| --- | --- | --- | --- |
| 1 | 100 | 0 | $2 \times 10^{-11}$ |
| 2 | 20 | 80 | $9 \times 10^{-8}$ |
| 3 | 10 | 90 | $1 \times 10^{-7}$ |

TABLE 2

IMPROVED HYDROPHOBIC TREATED BACKFILL COMPOSITIONS

| Example Number | Bentonite wt. % | Sand wt. % | Permeability k = cm/sec |
| --- | --- | --- | --- |
| 4 | 10 | 90 | $1 \times 10^{-12}$ |
| 5 | 10 | 90 | $1 \times 10^{-12}$ |
| 6 | 20 | 80 | $2 \times 10^{-13}$ |
| 7 | 20 | 80 | $2 \times 10^{-13}$ |

From the results listed in Tables 1 and 2, it is clear that the improved backfill of the present invention (Examples 4 to 7) does not exhibit the undesirable increased water permeability associated with conventional mixtures of clay and sand. Significantly, the advantage of the present invention is that any amount of hydrophobic coated sand (or other substrate) may be used in the backfill mixture without sacrificing the low water permeability of clayic material, in this case bentonite. Thus, the mechanical strength properties of the backfill may be increased to any desired level by changing the ratio of bentonite to sand without sacrificing the effectiveness of the barrier. The specific examples illustrated above are intended to help describe the invention and are not to be construed to limit the scope of the invention. Depending on the particular backfill properties desired, backfill materials within the range of 5–80% weight composition of clayic material and 95–20% weight composition of hydrophobic coated reinforcement material may be used.

While particular embodiments of the present invention have been described, it will be obvious to those skilled in the art that various changes and modifications may be made without departing from the invention in its broader aspects. It is intended that the appended claims cover all such changes and modifications as fall within the true spirit and scope of the present invention.

What is claimed is:

1. A backfill material for use in an engineering barrier, comprising:
    a clayic material selected from the group consisting of bentonite, montmorillonite, illite, kaolinite, laterite, ectorite, and attapulgite; and
    at least one noncementitious reinforcement material, said reinforcement material having a hydrophobic surface.

2. The backfill material according to claim 1, wherein the hydrophobic surface of the reinforcement material comprises an organic surface coating selected from the group consisting of organic titanate, organic silicone, alcohol and esters.

3. The backfill material according to claim 1, wherein the clayic material is bentonite, the reinforcement material is sand, and the hydrophobic surface is a coating of organic titanate.

4. The backfill material according to claim 1, wherein the clayic material is bentonite, the reinforcement material is sand, and the hydrophobic surface is a coating of polyethylene.

5. The backfill material according to claim 1, wherein the clayic material is bentonite, the reinforcement material is sand, and the hydrophobic surface is a coating of asphalt.

6. A backfill material for use in an engineering barrier, comprising a clayic material, and at least one reinforcement material, said reinforcement material having a hydrophobic surface;
    wherein the hydrophobic surface of the reinforcement material comprises an organic surface coating selected from the group consisting of resins, heavy oils, pitch, and asphalt.

7. A barrier for containing radioactive wastes, comprising a backfill material having a clayic material and at least one reinforcement material, said reinforcement material having a hydrophobic surface for minimizing water permeability of the barrier;
    wherein said backfill material comprises 5–80% weight composition of said clayic material and 95–20% weight composition of said reinforcement material; and
    wherein said hydrophobic surface comprises a coating on said reinforcement material formed of an organic compound, said organic compound being selected from the group consisting of resins, heavy oils, pitch and asphalt.

8. A backfill material in a barrier for containing radioactive wastes, comprising 5–80% weight composition of bentonite and 95–20% weight composition of surface coated sand, said surface coated sand having a hydrophobic surface coating formed of an organic compound.

9. The backfill material according to claim 8, wherein said organic compound is selected from the group consisting of resins, heavy oils, pitch and asphalt.

* * * * *